Figure 1:
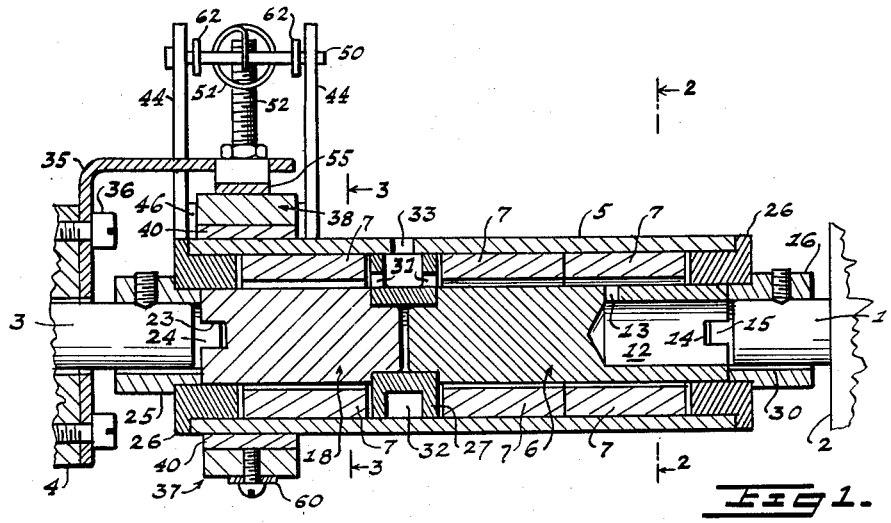

Feb. 10, 1959  W. STELZER  2,873,009
BRAKING SYSTEM FOR ELEVATORS
Filed Nov. 15, 1955

INVENTOR.
William Stelzer

United States Patent Office 2,873,009
Patented Feb. 10, 1959

2,873,009

BRAKING SYSTEM FOR ELEVATORS

William Stelzer, Summit, N. J.

Application November 15, 1955, Serial No. 546,913

9 Claims. (Cl. 192—2)

The invention relates to a braking system for elevators, and more particularly to a braking system for a motor-driven inclined or other open and unprotected elevator where the stopping distance must be short to provide the necessary safety.

The novel brake lends itself especially for use with low or moderate speed elevators driven by an electric motor where the kinetic energy of the running motor is great and that of the moving car relatively small and where no counterweight is used.

The object of the invention is to provide a novel brake that stops the moving car quickly and permits the electric motor to overrun to come to a stop after a longer period of time.

Another object is to eliminate the need for frequent adjustment of the brake by providing a spring tended friction device acting as a slipping clutch to transmit the torque from the motor to the rotary element of the brake and to absorb the kinetic energy of the motor when the rotary element of the brake is stopped.

Another object is to provide a spring tended slipping clutch to absorb the kinetic energy of the motor, and a second slipping clutch to absorb the kinetic energy of the car and transmission elements to produce a fast but smooth stop of the car and to relieve the brake of doing work which would cause it to wear.

A further object is to provide a braking system where a fast stop of the elevator can be obtained with the use of a small brake, and the necessary brake torque is reduced to a minimum.

Figure 2:
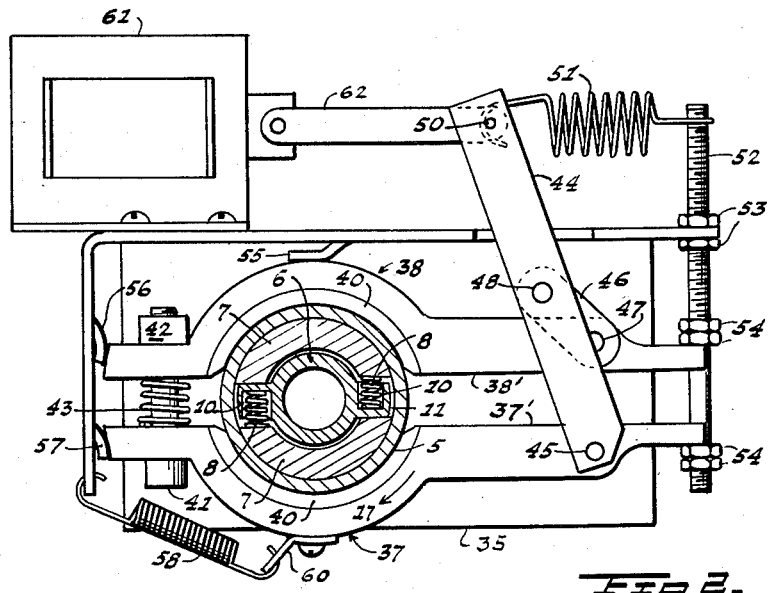

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a cross-sectional elevation of the improved braking device;

Fig. 2, a section taken on lines 2—2 of Fig. 1; and

Figure 3:
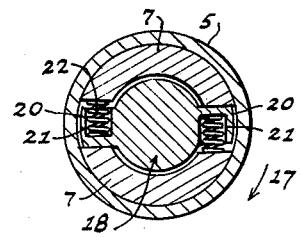

Fig. 3, a section taken on lines 3—3 of Fig. 1, showing only the elements in section.

Before explaining the present invention in detail, it is to be understood that the invention is not limited in its application to the details of construction and arrangement of elements illustrated in the accompanying drawing, since the invention is capable of other embodiments and of being practiced or carried out in various ways. Also it is to be understood that the phraseology or terminology employed herein is for the purpose of description and not limitation.

In the embodiment shown, the braking device is interposed between the drive shaft 1 of an electric motor 2 and the high speed shaft or transmission shaft 3 of a speed reducer 4. This speed reducer and motor are broken off since they are conventional elements. The speed reducer usually has a worm or pinion which would be driven by shaft 3. The low speed shaft of the speed reducer is connected to propel the elevator car, usually through the medium of a drum and cable or other similar device. In present constructions the motor shaft is coupled directly to the high speed shaft of the speed reducer, and the brake is applied to the motor shaft so that the speed reducer and motor are stopped together. In contrast, shafts 1 and 3 are coupled in series by a primary slipping clutch, a tubular brake drum 5, and a secondary slipping clutch. The primary slipping clutch consists of a spider 6 and a plurality of shoes 7 pressed against the inside surface of drum 5 by springs 8, each seated in a socket or hole 10 in the radial lugs 11 of spider 6. One end of spider 6 has a central bore 12 with an air hole 13, and radial grooves or splines 14 engaged by teeth 15 of a collar 16 secured to shaft 1. Arrow 17 in Fig. 2 indicates the direction of rotation of the motor shaft 1 when the elevator car is going up. It will be noted that due to the wrapping effect or self-energizing action of the clutch shoes the torque which the primary clutch is capable of transmitting from shaft 1 is greater than in the opposite direction of rotation when the motor is reversed for downward travel of the elevator car. The secondary slipping clutch comprises a spider 18 having radial lugs 20 with sockets 21 containing springs 22 urging clutch shoes 7 into sliding contact with the inside surface of brake drum 5. One end of spider 18 has radial grooves or splines 23 engaging teeth 24 of collar 25 secured to transmission speed shaft 3. Spider 18 could be firmly secured to shaft 3 and spider 6 could be firmly secured to shaft 1, but the radial splines and engaging teeth are incorporated to provide flexible joints to permit a slight misalignment of shafts 1 and 3. Drum 5 is held concentric with spiders 6 and 18 or shafts 1 and 3 by end bushings 26 and a central bushing 27. Spiders 6 and 18 are free to turn in these bushings and drum 5 can also turn relative to the bushings. The torque from motor 2 or shaft 1 is transmitted in series via collar 16, spider 6, shoes 7, drum 5, shoes 7 of the secondary clutch, spider 18, and collar 25 to shaft 3. Since the torque is transmitted from drum 5 to shoes 7 of the secondary clutch, the arrangement of the springs 22 is reversed so that the maximum torque transmitted when the elevator car is ascending and the brake drum turns is greater than in the opposite direction. The primary slipping clutch has two sets of shoes, and the secondary slipping clutch has one set. In order to obtain the same torque transmitting capacity springs 22 are approximately twice as strong as springs 8. In order to provide some sort of cooling for drum 5, an air passage 30 communicates with bore 12, air hole 13, and the space between spider 6 and shoes 7. Sleeve 27 has air holes 31 and a circular groove 32 in communication with holes 33 in cylinder 5, so that during rotation of the clutch members air enters passage 30 and is forced out through holes 33.

The brake mechanism for arresting drum 5 is mounted on a bracket 35 secured to the speed reducer housing 4 by means of screws 36. It is customary to use elevator brakes that are applied by spring pressure or weights and released by the force of a solenoid energized when the motor is energized. Thus in case of power failure the brake is applied automatically. In the embodiment shown a pair of external brake shoes 37 and 38 provided with linings 40 are hinged or held together by a bolt 41 and nut 42 with a stiff spring 43 interposed. The shoes have extending arms 37' and 38' to which a toggle linkage is hinged. One pair of toggle arms or levers 44 is pivoted to extension 37' by means of a pin 45 and another pair of short links 46 is pivoted to extension 38' by a pin 47 and to levers 44 by a pin 48. The outer or upper end of levers 44 carries a pin 50 engaged by a tension spring 51 secured to a threaded anchor pin 52 fastened to bracket 35 with nuts 53. Adjustable lock nuts 54 secured to the lower portion of anchor pin 52 serve as abutments for the outer extremities of extensions 37' and 38' to limit the opening movement of the shoes 37 and 38 when the brake is released and to take the reaction of the brake torque when the brake is applied. In order to center the shoes in the released position of the brake so that linings 40 have a running clearance with drum 5, I provide locating lugs 55, 56, and 57 struck out of the plane of the sheet metal plate of which bracket 35 is made. These lugs can be easily adjusted in order to obtain the desired clearance. A tension spring 58 secured to bracket 35 and to a tab 60 fastened to shoe 37 urges the shoes against the locating lugs so that the linings 40 do not touch the drum 5 when the brake is released.

To release the brake a solenoid 61 mounted on bracket 35 is provided. The plunger of the solenoid is operatively connected to pin 50 by means of links 62. The solenoid is electrically connected in parallel with motor 2 to be energized together with the latter to overpower spring 51 and hold the shoes in the released position as shown.

Describing now the operation of the braking device and assuming that motor 2 is running in the direction of arrow 17, the solenoid 61 is energized and the brake is in the released position. The torque from shaft 1 is transmitted through the primary slipping clutch to drum 5, and from the latter through the secondary slipping clutch to shaft 3. The clutches, sleeves and drum 5 rotate in unison. The torque which the clutches are capable of transmiting without slip should be slightly greater than the maximum of shaft 3 which is the torque when the elevator car carries the maximum load. If motor 2 is switched off, solenoid 61 is also deenergized so that spring 51 pulls lever 44 to the right to force extensions 37' and 38' together to engage the shoes with the drum. Due to the brake reaction, extension 37' abuts against lower lock nuts 54 while extension 38' moves away from its stop. Spring 51 is of such force that the brake torque developed by shoes 37 and 38 is greater than the resistance offered by the slipping clutches so that drum 5 is arrested immediately. The momentum of the drum itself is very small, so that the amount of energy changed into heat by shoes 37 and 38 is negligible and the wear of linings 40 is so little that no take-up adjustment of shoes 37 and 38 is required during the life of the brake. Shafts 1 and 3 continue to revolve because of their momentum. Both transmit a torque to drum 5 which the external brake has to resist. The torque imposed by shaft 1 is equal to the maximum torque which the primary slipping clutch is able to transmit. This maximum torque is the force which acts to decelerate the motor 2. Shaft 3 adds to the turning force that has to be resisted by the external brake shoes, but since the direction of the flow of power is reversed, there is no self-energizing action in the secondary clutch and the torque transmitted from shaft 3 to the brake drum is small. The forces which act to decelerate shaft 3 consist of the torque transmitted from shaft 3 to drum 5, the internal friction of the speed reducer 4, and the gravitational force acting on the ascending elevator car. Since the inertia forces of shaft 3 and other moving parts of the speed reducer and elevator are relatively very small, shaft 3 comes to a stop a small fraction of a second after drum 5 has stopped. The amount of energy changed into heat by the secondary clutch is very small. This is the reason why it has only one set of shoes, the smaller friction area being adequate to dissipate the heat. Shaft 1 of motor 2 comes to a stop last since the kinetic energy of the rotating parts of the motor is considerable. However, there is no disadvantage in requiring a longer time for stopping the motor, as this time may be only about one second depending on the type of motor and strength of spring 8. The dissipation of the energy takes place in the primary and secondary slipping clutches and accordingly shoes 7 are subject to wear. Springs 8 and 22 are sufficiently extensible that the clutches remain effective until shoes 7 are worn down where they need replacement.

If motor 2 is energized and reversed for downward travel of the elevator car, solenoid 61 is again energized to release the brake shoes. The maximum torque transmitted from shaft 1 to drum 5 is reduced because the rotation is in the opposite direction to that of arrow 17 and the self-energizing action of shoes 7 is lost. If the elevator car is loaded, torque may be transmitted from shaft 3 to drum 5 and then through the primary clutch to shaft 1 so that the motor acts as a brake when the synchronous speed is exceeded. With the flow of torque from shaft 3 to shaft 1 the capacity of the clutches is again increased by the wrapping effect of shoes 7 so that the maximum torque can be transmitted to restrain the elevator car from descending at an uncontrolled speed. If the motor is deenergized to stop the elevator, solenoid 61 is also deenergized so that spring 51 pulls lever 44 to the right to engage brake shoes 37 and 38 with drum 5 and immediately stop the latter. Shaft 1 continues to revolve due to the inertia of the rotor of motor 2 and thereby transmits a torque in the same direction of revolution to drum 5. This torque, however, is reduced because in this case there is no wrapping effect in the shoes 7 of the primary clutch. To this reduced torque acting on drum 5 is added the torque transmitted from shaft 3. The latter continues to rotate in the same direction as shaft 1 but since the flow of torque is from shaft 3 to the drum 5, the secondary clutch is capable of transmitting the maximum torque because of the wrapping effect of the shoes 7 of the secondary clutch. The force of shaft 3 tending to continue its revolution depends on the weight of the loaded elevator car and the momentum of shaft 3 and other transmission or moving parts, including the elevator car itself or the load, and is reduced by the friction of the transmission. Since the momentum is very small, and the torque of the secondary clutch is greater than the maximum torque induced by the loaded elevator car, shaft 3 comes to a stop a small fraction of a second after drum 5 has been arrested. Motor 2 comes to a stop after a longer period of time than was required when the elevator had ascended. The difference in time can be reduced by reducing the self-energizing action of shoes 7 which can be accomplished in various known manners, one being the reduction in the arc of the shoes. If the wrap factor of shoes 7 is 2, and one second is required to stop motor 2 when the elevator is ascending, then two seconds would be required to stop the motor after descent of the elevator. Using self-energizing slipping clutches as shown has the advantage that the torque required to arrest drum 5 is reduced and is approximately the same whether the elevator is ascending or descending.

Since the momentum of shaft 3 and the transmission elements is small, it could be argued that drum 5 could be rigidly connected with shaft 3. This would still provide the important advantage that the dissipation of the major part of the kinetic energy would take place in the primary clutch, and linings 40 would still not be subject to appreciable wear, but with the use of the secondary clutch the desirable advantage is gained where the stopping distance is approximately the same for the ascending and descending elevator. The secondary clutch also prevents an abrupt stop, besides reducing the maximum load of the external brake.

The "slipping clutches" described are elements of the brake and should not be confused with a conventional clutch used to connect or disconnect two rotating elements. The term "clutch" or "slipping clutch" has been used herein for convenience only to distinguish from the external brake 37. In fact, they perform the actual braking while the brake 37 merely acts to arrest the brake drum 5.

Having thus described my invention, I claim:

1. In a braking system for an elevator having an electric motor and a transmission shaft to drive the car of said elevator, in combination, a rotary member, means to revolubly suport said rotary member, a friction type slipping clutch coupled with said motor and aranged to be coaxial with said rotary member to transmit torque between said rotary member and said motor, means to transmit torque between said rotary member and said transmission shaft, a brake arranged to arrest said rotary member, resilient means to apply said brake, and means to release said brake so that torque can be transmitted between said motor and said transmission shaft through said slipping clutch, said rotary member, and said means to transmit torque.

2. In a braking system for an elevator having an electric motor and a transmission shaft to drive the car of said elevator, in combination, a rotary member, means to revolubly support said rotary member, a friction type slipping clutch coaxial with said rotary member, means to transmit torque between said slipping clutch and said motor, means to transmit torque between said rotary member and said transmission shaft, a brake operatively connected to arrest said rotary member, spring means to apply said brake, and a solenoid operatively connected with said brake to overpower said spring means and release said brake when said solenoid is not energized so that said rotary member is free to revolve with said slipping clutch to transmit torque between said motor and said transmission shaft.

3. In a braking system for an elevator having an electric motor and a transmission shaft to drive the car of said elevator, in combination, a rotary member, means to revolubly support said rotary member, a primary friction type slipping clutch coaxial with said rotary member, means to transmit torque between said slipping clutch and said motor, a secondary friction type slipping clutch coaxial with said rotary member and arranged to transmit torque between said rotary member and said transmission shaft, a brake operatively connected to arrest said rotary member, spring means to apply said brake, and a solenoid operatively connected with said brake to overpower said spring means and release said brake when said solenoid is not energized so that said rotary member is free to revolve with said slipping clutches to transmit torque between said motor and said transmission shaft.

4. In a braking system for an elevator having an electric motor and a transmission shaft to drive the car of said elevator, in combination, a rotary member, means to revolubly support said rotary member, a primary friction type slipping clutch coaxial with said rotary member, means to transmit torque between said slipping clutch and said motor, a secondary friction type slipping clutch coaxial with said rotary member and arranged to transmit torque between said rotary member and said transmission shaft, said slipping clutches being partly self-energizing so that said clutches have a greater capacity to transmit torque from said motor to said transmission shaft when said motor turns in a direction to raise the car of said elevator than when said motor turns in the opposite direction, a brake operatively connected to arrest said rotary member, and means to operate said brake.

5. In a braking system for an elevator having an electric motor and a transmission shaft to drive the car of said elevator, in combination, a tubular rotary member, means to revolubly support said rotary member, a primary friction type slipping clutch coaxial with and located inside said tubular rotary member, said friction clutch having a spider coupled to the shaft of said motor, friction elements carried by said spider and in sliding engagement with the inside surface of said tubular rotary member, a secondary friction type slipping clutch coaxial with and located within said tubular rotary member, said secondary slipping clutch having a spider coupled with said transmission shaft, friction elements carried by said spider of said secondary slipping clutch and in sliding engagement with the inside surface of said tubular member, springs carried by said spiders and pressing said friction elements against the inside surface of said rotary member, a brake operatively connected to arrest said rotary member, and means to operate said brake.

6. The construction as claimed in claim 5, and means to revolubly support said spiders to be coaxial with said rotary member.

7. The construction as claimed in claim 5, where said brake includes a pair of brake shoes adapted to engage the external surface of said rotary member so that the latter functions as the brake drum of said brake, said means to operate said brake including toggle links pivotally secured to said brake shoes, a spring urging said toggle links in a position to engage said shoes with said rotary member, and means to disengage said brake shoes from said rotary member.

8. The construction as claimed in claim 5, and air passage means to produce a flow of air through said primary slipping clutch to cool said primary slipping clutch.

9. In a braking system for an elevator including an electric motor having a shaft, a transmission shaft coaxial with said motor shaft and spaced from said motor shaft, in combination, a collar mounted on said motor shaft to revolve therewith, a collar mounted on said transmission shaft to revolve therewith, a tubular rotary member coaxial with said shafts, bushings in the ends of said rotary member revolubly supported by said collars and having sufficient play to be free in spite of a slight coaxial misalignment of said motor shaft and said transmission shaft, a primary friction type slipping clutch within said tubular rotary member frictionally engaging said tubular member, a toothed coupling to engage said primary friction type slipping clutch with said collar on said motor shaft, a secondary friction type slipping clutch within said tubular member frictionally engaging said tubular member, a toothed coupling to engage said secondary slipping clutch with said collar on said transmission shaft, a brake external of said tubular rotary member operatively connected to arrest said rotary member, and means to operate said brake.

References Cited in the file of this patent

UNITED STATES PATENTS

| | | |
|---|---|---|
| 812,758 | Libby | Feb. 13, 1906 |
| 2,023,689 | Laughlin | Dec. 10, 1935 |
| 2,194,228 | Jex | Mar. 19, 1940 |
| 2,285,134 | Williams | June 2, 1942 |
| 2,406,644 | Sparagen | Aug. 27, 1946 |
| 2,554,330 | Hodgson | May 22, 1951 |
| 2,572,528 | Selander | Oct. 23, 1951 |
| 2,618,368 | Hoover | Nov. 18, 1951 |
| 2,642,169 | Hutchinson | June 16, 1953 |
| 2,675,103 | Weber | Apr. 13, 1954 |